(12) United States Patent
Beall et al.

(10) Patent No.: US 7,947,355 B2
(45) Date of Patent: May 24, 2011

(54) HIGH POROSITY THERMALLY SHOCK RESISTANT CERAMIC STRUCTURES

(75) Inventors: Douglas Munroe Beall, Painted Post, NY (US); George Halsey Beall, Big Flats, NY (US); Martin Joseph Murtagh, Trumansburg, NY (US)

(73) Assignee: Corning Incorporated, Corning, NY (US)

( * ) Notice: Subject to any disclaimer, the term of this patent is extended or adjusted under 35 U.S.C. 154(b) by 782 days.

(21) Appl. No.: 11/897,108

(22) Filed: Aug. 29, 2007

(65) Prior Publication Data
US 2008/0063833 A1    Mar. 13, 2008

Related U.S. Application Data

(60) Provisional application No. 60/840,767, filed on Aug. 29, 2006.

(51) Int. Cl.
*B32B 3/12* (2006.01)
*B01D 39/06* (2006.01)
*B01D 53/34* (2006.01)

(52) U.S. Cl. ............................ 428/116; 55/523; 422/180

(58) Field of Classification Search .................. None
See application file for complete search history.

(56) References Cited

U.S. PATENT DOCUMENTS

| 4,435,512 | A | * | 3/1984 | Ito et al. ........................ 501/32 |
| 4,595,662 | A | | 6/1986 | Mochida et al. ................ 501/15 |
| 5,549,725 | A | | 8/1996 | Kasai et al. ..................... 55/523 |
| 5,552,349 | A | | 9/1996 | Ichii et al. ......................... 501/9 |
| 2005/0115214 | A1 | | 6/2005 | Saha et al. ..................... 55/523 |
| 2005/0239640 | A1 | | 10/2005 | Nilsson et al. ................ 502/202 |
| 2006/0064957 | A1 | | 3/2006 | Ogunwumi et al. ............ 55/523 |

FOREIGN PATENT DOCUMENTS

| WO | 2007/064497 | 6/2007 |
| WO | 2007/142921 | 12/2007 |

OTHER PUBLICATIONS

U.S. Appl. No. 11/823,673, filed Jun. 28, 2007, Beall et al.
U.S. Appl. No. 11/823,709, filed Jun. 28, 2007, Beall et al.

* cited by examiner

*Primary Examiner* — Gordon R Baldwin
(74) *Attorney, Agent, or Firm* — Kees van der Steere; Matthew B. McNutt; Matthew J. Mason

(57) ABSTRACT

A thermally shock resistant ceramic body, such as a porous ceramic honeycomb structure for a wall flow diesel engine exhaust filter or a flow-through ceramic catalyst support, is formed of a composite ceramic material comprising a major first ceramic phase exhibiting good thermal shock resistance and a minor second phase material that substantially reduces the elastic modulus of the composite ceramic material at elevated temperatures.

14 Claims, 1 Drawing Sheet

HIGH POROSITY THERMALLY SHOCK RESISTANT CERAMIC STRUCTURES

RELATED APPLICATIONS

This application claims the benefit of, and priority to, U.S. Provisional Patent Application No. 60/840,767 filed Aug. 29, 2006 entitled 'Thermally Shock Resistant Ceramic Structures," the disclosure of which is hereby incorporated by reference herein.

BACKGROUND OF THE INVENTION

The present invention pertains to thermally shock resistant ceramics, and more particularly to a ceramic honeycomb structures such as ceramic catalyst supports or particulate filters having high thermal shock resistance, useful for example in thermally demanding applications such as motor vehicle exhaust gas catalyst supports and soot filters.

Wall-flow diesel particulate filters (DPFs) and ceramic catalyst supports generally comprise thin-walled ceramic honeycomb structures with high geometric surfaces areas and, in some cases, with extensive interconnected porosity for good fluid filtration. Ceramic filters, in particular, must exhibit high mechanical strength for handling and superior thermal shock resistance in operation.

The thermal shock resistance (TSR) of a composite ceramic body is related to the stress at fracture (as given by strength at fracture MOR or Modulus of Rupture), the elastic modulus (E) and the strain at fracture i.e. the product of thermal expansion coefficient ($\alpha$) and thermal gradient ($\Delta T$), through the following expression:

$$TSR \propto \frac{MOR}{E \cdot \alpha \cdot \Delta T}$$

High levels of thermal shock resistance have typically been sought by attempting to obtain extremely low values of thermal expansion coefficient, or through methods to reduce thermal gradients during high temperature use. However, it can be seen from the expression above that use of a material with a sufficiently high strength and a sufficiently low bulk elastic modulus (i.e. an increased strain tolerance) could offer adequate thermal shock resistance for some applications.

Cordierite is known for its low thermal expansion coefficient, high refractoriness, porosity control, and ease of processing in applications for emissions control devices such as catalyst supports and diesel particulate filters. Advantageously, most cordierite honeycomb bodies being manufactured today achieve a lower bulk thermal expansion coefficient than would be expected from the crystallographic properties of cordierite, due to crystal orientation in the bodies and the presence of microcracks in the cordierite material. Microcracks can arise from stresses resulting from the anisotropic thermal expansion of regions of oriented cordierite crystallites (domains) during the cooling step of the firing process. During subsequent heating, the thermal expansion of the cordierite is lowered when the microcrack voids act as expansion joints, giving a bulk thermal expansion coefficient lower than that of a body with no microcracks. On cooling, the cracks reopen in a reversible process.

Microcracks can be beneficial to thermal shock resistance in many applications, but also are accompanied by certain drawbacks. One drawback is that the strength of the body is reduced by the presence of microcracks. Another is that the bulk coefficient of thermal expansion is sensitive to the processes that alter the way the microcracks heal and reopen during use.

One way the microcracking effect on thermal expansion coefficient can be interrupted is by the intrusion of foreign matter into the crack. It has been found that catalyst washcoat materials, particulates such as soot present in diesel engine exhaust gases, and residual ash material arising from inorganic constituents present in fuels and thus the exhaust streams of combustion engines can be introduced into open microcracks of ceramic filters or catalyst supports. This foreign matter can act as pillars and/or wedges in the microcracks of the ceramic, reducing or eliminating those cracks as factors in lowering the bulk thermal expansion and the elastic modulus of the structures. The net result is a reduction in thermal shock resistance.

Because of these pillaring effects, it would be considered an advancement in the art of DPF and catalyst support applications if a composite ceramic body could be developed having a high degree of thermal shock resistance in the absence of microcracks.

SUMMARY OF THE INVENTION

In accordance with the present invention, there is provided a composite ceramic body comprising a major first phase of a crystalline ceramic material and a minor second phase of material effective to modify the properties of the composite so that it retains a high modulus of rupture strength as well as a high resistance to thermal shock damage. The second or minor phase material imparts a higher degree of thermal shock resistance to the body by increasing the strain tolerance of the body at elevated temperatures, as compared with a body absent the second phase material. Thus the minor phase material makes the body more compliant at high temperatures, thereby reducing the stresses that arise in the presence of thermal gradients caused by rapid heating or cooling.

According to embodiments of the invention, the composite ceramic honeycomb body comprises a substantially of a non-microcracked first ceramic phase with relatively good thermal shock resistance, and a minor second phase of a material that imparts at least a reduction in the elastic modulus of the composite ceramic in the temperature range of 600° C.-1100° C., as compared with the room temperature value of the elastic modulus of the composite ceramic and wherein a total porosity (% P) of the body is % P≧45%.

In a second embodiment, the composite ceramic honeycomb body comprises a substantially of a ceramic phase with relatively good thermal shock resistance that may be composed of a microcracked ceramic, and a minor second phase of a material disposed at the grain boundaries of the first ceramic phase, the minor second phase imparting a reduction in the elastic modulus of the composite ceramic in the temperature range of 600° C.-1100° C., as compared to the room temperature value and a total porosity (% P) of the structure is % P≧45%.

In yet another embodiment there is disclosed a ceramic honeycomb structure with a high thermal shock resistance comprising two or more constituent phases in the structure, wherein the major constituent phase is a microcracked or a substantially non-microcracked ceramic, and wherein one of the minor constituent phases reduces the elastic modulus of the structure in the temperature range 600-1100° C., as compared to the room temperature value for the structure. The minor constituent phase that imparts increased thermal shock resistance to the honeycomb structure may be a glassy phase predominantly distributed at the grain boundaries of the major constituent phase, or it may be a glass-ceramic or ceramic phase that improves the high temperature compliance or strain tolerance of the structure and a total porosity (% P) of the structure is % P≧45%.

Further provided in accordance with the invention are a ceramic honeycomb wall-flow particulate filter or a flow-through honeycomb ceramic catalyst support with a high thermal shock resistance comprising a ceramic honeycomb structure with two or more constituent phases, wherein a minor constituent phase is provided that imparts a reduction in the elastic modulus of the structure in the temperature range of 600° C.-1100° C., as compared to the room temperature value for the structure. The honeycomb structure total porosities may exhibit % P≧45%, or even % P≧50%, for example.

Also provided are flow-through ceramic honeycomb catalyst supports are disclosed that may have microcracked structures in which the microcracks are filled with a glassy second phase imparting a reduction in the elastic modulus of the structure in the temperature range of 600° C.-1100° C., as compared to the room temperature value.

The invention further encompasses a method of manufacturing the ceramic honeycomb structures such as herein described. The method of manufacturing a ceramic honeycomb structure, comprising the steps of forming a ceramic batch mixture comprising a liquid vehicle, a major batch component for a crystalline ceramic phase, and a minor batch component for a glass, glass-ceramic, or ceramic phase exhibiting an elastic modulus below the elastic modulus of the crystalline ceramic at temperatures in the range of 600° C.-1100° C.; shaping the ceramic batch mixture into a honeycomb structure; drying the honeycomb structure; and firing the honeycomb structure, said fired structure including a major ceramic first phase and a minor second phase for lowering the elastic modulus of the structure at elevated temperatures. The total porosity (% P) of the fired structure may be % P≧45%. Additionally, the coefficient of thermal expansion (CTE) of the structure may be CTE≦16.0×10−7/° C.

BRIEF DESCRIPTION OF THE DRAWINGS

The invention is further described below with reference to the attached drawings, wherein.

DETAILED DESCRIPTION

Figure 1:
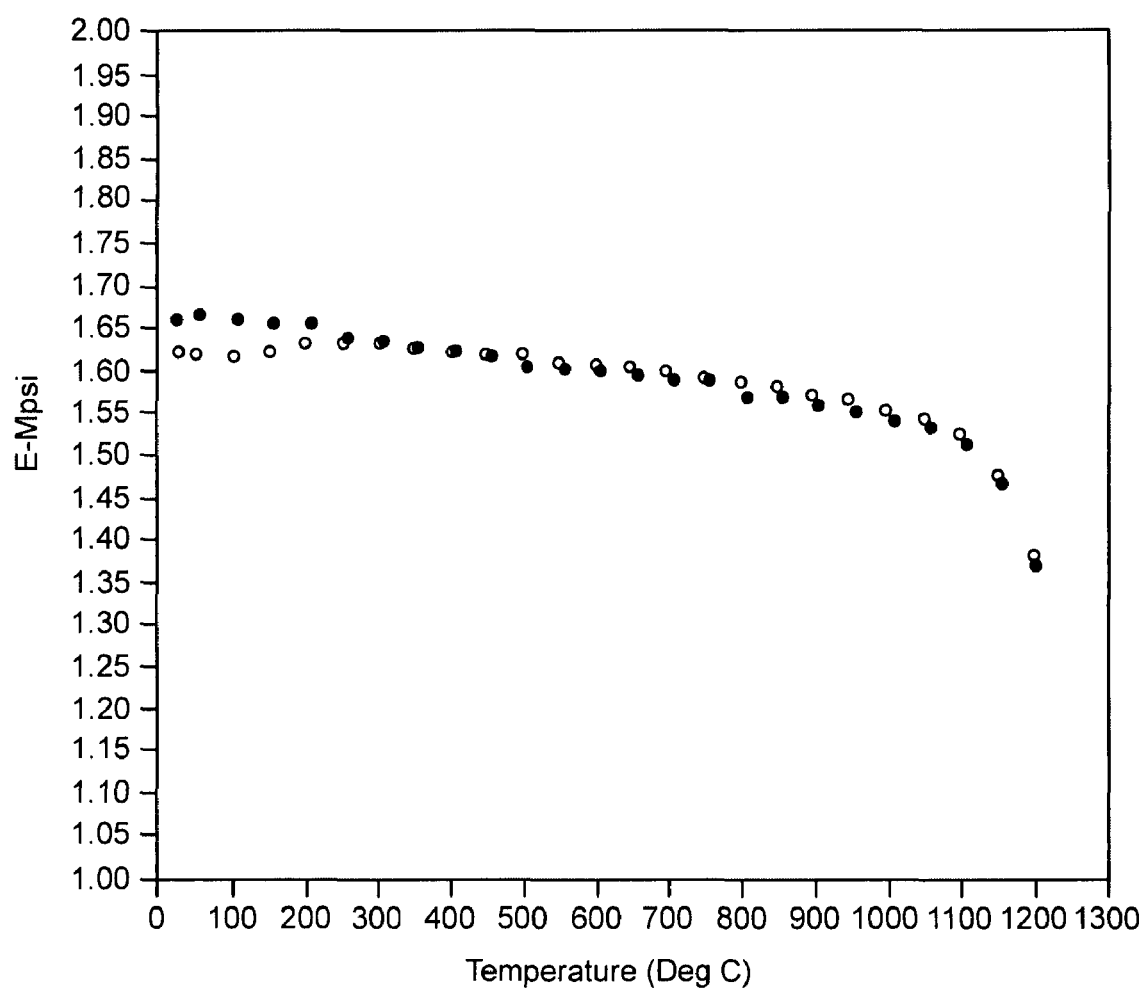
FIG. 1 is a plot of the elastic modulus (Mpsi) versus temperature (° C.) during heating and cooling of an inventive low microcracked cordierite embodiment of the invention.

In an important aspect, the present invention resides in the successful application of selected composite ceramic materials to applications for ceramic honeycomb filters and catalyst supports that require particularly high thermal shock resistance. These include honeycombs for diesel particulate filters (DPFs), for catalyzed diesel particulate filters, and for flow-through ceramic honeycomb catalyst supports located at points of rapid temperature change in engine exhaust treatment systems. The inventive composite ceramic materials that are effective for these applications comprise at least two identifiable ceramic or glassy phases that combine to provide composite ceramic bodies with improved modulus of rupture strength as well as improved thermal properties.

The first phase of the composite is a majority constituent thereof, i.e., the major phase of the ceramic, and is a crystalline ceramic phase of moderate to low thermal expansion. The second or minor phase may be a crystalline ceramic or a glassy ceramic phase, but in either case must have the essential property of reducing the elastic modulus of the composite material at high temperature 600° C.-1100° C. as compared to at Room Temp (25° C.). In particular, the reduction in elastic modulus is at least is by at least 5% at a temperature of 900° C., as compared to the room temperature value (@25° C.) for the material. In other words, $E_{900° C.}/E_{RT}$ is less than 1.00, or even less than 0.95.

The first or major ceramic phase of the composite will generally be a phase having good inherent thermal shock resistance, and it will account for approximately 80-98% of the weight of the composite ceramic material or the honeycomb body into which it is made. That major phase is preferably cordierite, although other crystalline ceramics with moderately good thermal shock resistance and refractoriness, such as mullite, silicon carbide, and zircon, can also serve as, or be an important component of, the major phase.

When cordierite is used as the major phase, it will preferably be a cordierite that is substantially free of microcracks. Freedom from microcracks is particularly desirable if the composite ceramic is to be made into a catalyst-bearing or uncatalyzed ceramic wall flow DPF of high porosity, since mechanical strength is at a premium in high porosity ceramics. When the composite ceramic is to be used to fabricate flow-through ceramic catalyst support structures for engine exhaust treatment applications, lower porosities are suitable, particle trapping is not required, and thus freedom from microcracks is not critical.

The second or minor phase of the composite ceramic will be composed of a glass or ceramic material exhibiting a substantially reduced elastic modulus at temperatures in the range of about 600-1100° C., that range being the range wherein thermal shock damage to ceramic honeycomb structures is most likely to occur in emissions control devices employing such honeycombs. In some preferred embodiments of the invention, the minor phase will consist of a glass phase which softens to a viscosity in the range of about $10^6$-$10^{13}$ poise within the aforementioned temperature range.

Borosilicate glasses containing alkali, alkaline earth, and alumina are examples glass phases that are appropriate for forming the second phase. More broadly, the second phase may be formed from a silicate glass selected from the group consisting of alkali- and/or alkaline-earth-containing borosilicate, aluminosilicate, and boroaluminosilicate glasses. The minor glass phase in these embodiments is most generally located at grain boundaries of the major phase, that phase distribution being the most effective in reducing the elastic modulus of the bulk composite ceramic body while maintaining high strength at elevated temperatures.

Where the second phase is a crystalline ceramic or glass-ceramic phase having a substantially reduced elastic modulus at elevated temperatures (i.e., and elastic modulus below the elastic modulus of the major ceramic phase at such temperatures), the second phase material is desirably one that is in thermodynamic equilibrium with the first phase. Further, as is the case with the minor glass phase, the minor glass-ceramic or ceramic phase is preferably located at the grain boundaries of the first phase for most desirable effect. One example of a minor ceramic phase material is phlogopite, a natural or synthetically formed sheet aluminosilicate of micaceous structure offering good thermal, chemical, and mechanical properties for this application.

Additional equilibrium minor glass or ceramic phases can optionally be present in these composite ceramic materials, but are incidental to the present invention. In an exemplary structure wherein cordierite constitutes the major phase of the composite ceramic, species such as spinel or mullite may incidentally be present as minor phases interspersed with the major phase in the material. Such incidental phases will generally not have significant effects on the properties of the final honeycomb structure, however.

The general process for manufacturing the composite ceramic bodies of the invention includes mixing the ingredients for the first and second phases with a liquid vehicle such as water, optionally including conventional binders, pore formers, and lubricants as desired to improve the handling properties of the resulting plasticized batch mixture. The resulting batch mixture is then extruded or otherwise formed into honeycomb shapes, dried as necessary for shape retention, and finally fired to produce the final composite ceramic honeycomb structure.

To produce a composite wherein cordierite constitutes the major phase, either of two approaches can be used depending upon whether microcracking within the major phase of the composite is permissible. For a microcracked body, ceramic precursors such as talc, clay and alumina are used in proportions effective to form a major cordierite crystalline phase from the precursors upon firing. To produce a cordierite structure without microcracks, cordierite powders in bulk, or mixtures of the described cordierite precursors that include minor additions of a cordierite powder to act as nucleation seeds for rapid cordierite formation on firing, will be included as raw materials in the plasticized batch mixture. In summary, for non-microcracked products, crystalline cordierite will be included as a batch raw material in proportions between 0.1% and 100% by weight of the total major phase component of the batch.

Strategies similar to those employed above for cordierite ceramic can be used to produce non-cordierite ceramic honeycomb structures from ceramic starting materials such as mullite, SiC and zircon. Again, ceramic precursors can be used in proportions effective to form desired ceramic major phases on firing, or powders of the major phase materials can be incorporated directly into the batch.

Where the second, minor phase of the composite it to be a glassy phase, two options exist. Glass forming oxides can be added into the batch mixtures to form a selected glass phase via reactions during honeycomb firing. Alternately, the glassy phase materials can be melted and processed ahead of time, for example by conventionally preparing frits of the desired glasses and grinding the frits into powders of suitable particles sizes.

Among the preferred materials for glassy minor phases in these composites are high strain point glasses having a relatively flat viscosity response to temperature (i.e. glasses exhibiting a relatively high viscosity over a relatively wide temperature range). Since it is desired that the minor glass phase be located at major crystalline phase grain boundaries, the glass material should be distributed evenly throughout the first phase ceramic material in the composite. For high viscosity glasses this is best accomplished via a thorough dispersion of glass powder within the major phase ceramic materials during batch mixing. Alternatively, glasses that are fluid at composite firing temperatures can be employed, if the glass composition is such that the glass will phase-separate on cooling into a well distributed viscous glass phase of low elastic modulus in the thermal shock range, and a minor fluid phase that can crystallize to a stable material on cooling.

The practice of the invention further envisages the use of major phase ceramic materials wherein some dissolution of major phase raw materials into minor glass phases during firing could occur. Minor glassy phase materials that can readily accommodate such dissolution include alkali- and/or alkaline-earth-containing borosilicate, aluminosilicate, and boroaluminosilicate glasses. Particular examples of such glasses include Corning Codes 7761, 1723, and 1720 glasses. Straight borosilicate glasses with silica contents in the range of 77-85% silica can also accommodate such dissolutions. Some examples of the invention are provided in Table 1 below.

TABLE 1

Comparative and inventive compositions

| Raw Material | Ex. 1 | Ex. 2 | Ex. 3 | Ex. 4 |
|---|---|---|---|---|
| FCor Talc | 40.7 | 40.7 | 40.7 | 40.7 |
| A3000 Alumina | 14.8 | 14.8 | 14.8 | 14.8 |
| AC714 Hydrated Alumina | 16.0 | 16.0 | 16.0 | 16.0 |
| Cerasil 300 Silica | 12.5 | 12.5 | 12.5 | 12.5 |
| K10 Kaolin | 16.0 | 16.0 | 16.0 | 16.0 |
| cordierite seeds (−200 mesh) | 1.00 | 1.00 | 1.00 | 1.00 |
| Pyrex 7761 Crushed Glass (−100 mesh) | 0.0 | 2.0 | 5.0 | 10.0 |
| Graphite | 20.0 | 20.0 | 20.0 | 20.0 |
| Methycellulose | 4.00 | 4.00 | 4.00 | 4.00 |
| Sodium Stearate | 0.50 | 0.50 | 0.50 | 0.50 |

In these embodiments, the inorganic batch is made up of a magnesia forming source, such as talc and/or kaolin clay, an alumina forming source, such as alumina, hydrated alumina, or even a combination thereof, and a silica forming source such as silica are mixed with a crushed borosilicate glass powder (−100 mesh), or alternatively 1 wt. % fired cordierite seeds (−200 mesh), as a nucleation agent. A pore former, such as a graphite pore former, and processing aids, such as methocellulose, sodium stearate, and water, are added. This mixture was kneaded and formed into a plasticized batch which is then extruded through an extrusion die. In the examples, a 200/12 green honeycomb structure was formed, although it should be recognized that any suitable structure may be formed from 10-1200 cpsi and from 0.001 to 0.030 inch wall thickness, for example. The green honeycomb article includes a plurality of interconnected walls forming a plurality of axially extending channels. After being suitably dried, such as by dielectric or microwave drying, the honeycomb articles are fired. Suitable firing schedules include ramping to a hold at between 1400° C. and 1425° C. and holding for 5-20 hours, or even 8 to 12 hours, for example, to form a substantially non-microcracked ceramic honeycomb having a predominant crystalline phase of cordierite. The fired properties of resulting exemplary honeycomb articles are shown in Table 2 below.

TABLE 2

Inventive Example Properties

| Ex. | % Glass | $I_A$ | $I_T$ | $CTE_{RT}$ ($\times 10^{-7}$/° C.) RT-800° C. | $MOR_{RT}$ (psi) Cellular | $Emod_{RT}$ (psi) ×10$^6$ | $MOR_{RT}$/$E\text{-mod}_{RT}$ (%) |
|---|---|---|---|---|---|---|---|
| 1 | 0.0 | 0.61 | 0.68 | 14.9 | 809 | 1.31 | 0.062 |
| 2 | 2.0 | 0.62 | 0.70 | 14.1 | 793 | 1.31 | 0.061 |
| 3 | 5.0 | 0.63 | 0.68 | 14.8 | 996 | 1.41 | 0.071 |
| 4 | 10.0 | 0.62 | 0.69 | 14.9 | 1511 | 1.66 | 0.091 |

As should be recognized, coefficient of thermal expansion (CTE) from room temperature (RT) to 800° C. of less than $16.0 \times 10^{-7}$/° C., or even less than $15.0 \times 10^{-7}$/° C. in at least one direction are achieved by exemplary embodiments of the invention. The difference in I ratio, defined as $\Delta I = I_T - I_A$, being $\Delta I \leq 0.1$ is indicative of random crystal orientation of the invention, wherein $I_A$ is the axial I ratio and $I_T$ is the transverse I ratio. Additionally, it should be recognized that inclusion of crushed glass in the batch, and the formation of the secondary phase, substantially increases the modulus of rupture. In particular, addition of 5.0 wt. % or more of glass increases the MOR to greater than 900 psi measured on a cellular sample on a 4-point bend test. Addition of 10.0 wt. % or more of glass increases the MOR to 1000 psi or more, 1250 psi or more, or even 1500 psi or more. Strain tolerance at room temperature ($MOR_{RT}$/E-$mod_{RT}$) of greater than 0.06%, greater than 0.07%, greater than 0.08%, or even greater than 0.09% may be provided.

Further properties of the exemplary embodiments of the invention are described in Tables 3 below.

TABLE 4

Inventive Example Properties, Cont.

| Ex. | % Glass | $CTE_H$ (500-900° C.) $\times 10^{-7}$/° C. | $Emod_{RT}$ (psi) $\times 10^6$ | $Emod_{500}$ @500° C. ($\times 10^6$ psi) | $Emod_{900}$ @900° C. ($\times 10^6$ psi) | $Emod_{1100}$ @1100° C. ($\times 10^6$ psi) | $Emod_{RT}$/ $Emod_{900}$ | $Emod_{RT}$/ $Emod_{1100}$ |
|---|---|---|---|---|---|---|---|---|
| 1 | 0.0 | 20.5 | 1.31 | 1.27 | 1.25 | 1.23 | 0.95 | 0.94 |
| 2 | 2.0 | 19.8 | 1.31 | 1.26 | 1.22 | 1.20 | 0.93 | 0.92 |
| 3 | 5.0 | 20.4 | 1.41 | 1.38 | 1.31 | 1.27 | 0.93 | 0.90 |
| 4 | 10.0 | 20.5 | 1.66 | 1.60 | 1.60 | 1.54 | 0.96 | 0.93 |

Additional performance and properties of exemplary embodiments of the invention are described in Table 4 below.

TABLE 4

Inventive Example Properties, Cont.

| Ex. # | % Glass | % P (%) | Intrusion (g/cc) | MPD (μm) | $d_f$ | Clean ΔP kPa | Soot Loaded ΔP (5 g/L) kPa | Cord. (%) | Spinel (%) |
|---|---|---|---|---|---|---|---|---|---|
| 1 | 0.0 | 52.3 | 0.4298 | 15.55 | 0.72 | 1.32 | NA | 98 | 2.1 |
| 2 | 2.0 | 51.0 | 0.4311 | 15.97 | 0.70 | NA | NA | 99 | 0.6 |
| 3 | 5.0 | 50.3 | 0.4080 | 16.27 | 0.63 | NA | NA | 99 | 0.0 |
| 4 | 10.0 | 47.7 | 0.3640 | 17.88 | 0.49 | 1.29 | 5.92 | 100 | 0.0 |

As can be recognized, total porosities (% P) of % P≧45%, % P≧46%, or even % P≧50% may be achieved according to embodiments of the invention. Additionally, ranges of 45%≦% P≦55%, or even ranges of 46%≦% P≦53% are demonstrated. Additionally, median particle diameters of between 10 μm and 20 μm may also be demonstrated so that soot loaded back pressure losses are reduced and that strength is maximized. So called "d-factor" ($d_f$) may be provided wherein $d_f$≦0.75, $d_f$≦0.70, or even $d_f$≦0.50. The $d_f$ is defined herein as $d_f=(d_{50}-d_{10})/d_{50}$ wherein $d_{50}$ is the median particle diameter and $d_{10}$ is the diameter wherein 10% of the particles, by volume, have a smaller diameter. Further, greater than or equal to 97%, or even greater than or equal to 98%, of a cordierite phase may be demonstrated by the invention. Additionally, E-mod at high temperature is lower than E-mod at room temperature, in accordance with the invention.

Cordierite-phlogopite-MAT (mullite aluminum titanate) ceramic or glass-ceramic materials are also useful minor phase materials in these composite ceramics. To achieve best results with these minor phase constituents, a glass-ceramic powder having a phase assemblage comprising 45-70% cordierite, 20-40% phlogopite, and 10-15% mullite+aluminum titanate is first prepared, and that powder is then mixed with the major phase material, plasticized, formed and fired to the final composite ceramic honeycomb structure. The phlogopite phase will provide a low elastic modulus due to its sheet silicate structure, and will also impart high toughness in the manner observed in machinable fluorphlogopite glass-ceramics.

As noted above, the increased thermal shock resistance of the ceramic honeycombs of the invention as compared with honeycombs formed of unmodified ceramic major phase materials is presently attributed to the reduction in elastic modulus imparted by the minor second phases, and in particular a reduction in the elastic modulus at room temperature (E-$mod_{RT}$) as compared to the elastic modulus at high temperature (such as E-mod at 600 to 1100° C.). FIG. 1 discloses a plot of elastic modulus of the honeycomb embodiment of Example 4 wherein a reduction in the elastic modulus is demonstrated at between 600° C. and 1100° C. as compared to room temperature (RT=23° C.). The filled circles represent the heating curve and the unfilled circles represent the cooling curve. In particular, the lack of hysteresis denotes a substantially non-microcracked structure. In particular, the ratio of E-$mod_{RT}$/E-$mod_{900}$ according to embodiments of the invention may be 1.00 or less, or even 0.95 or less, for substantially non-microcracked ceramics. Similarly, the ratio of $Emod_{RT}$/$Emod_{1100}$ may be 0.99 or less, 0.95 or less, or even 0.94 or less. This approach to increased thermal shock resistance can, in fact, enable the use of ceramic materials that in their unmodified states have unacceptable thermal shock resistance for ceramic honeycomb applications, but that otherwise have desirable chemical and mechanical properties.

Since these and other modifications and changes varied to fit particular operating requirements and environments will be apparent to those skilled in the art, the invention is not intended to be limited to the particular examples and embodiments chosen above for purposes of illustration, but rather extends to all variations and modifications thereof falling within the scope of the appended claims.

What is claimed is:
1. A composite ceramic honeycomb body, comprising:
a first ceramic phase and a second phase that increases the thermal shock resistance of the composite ceramic body, characterized in that the second phase is a minor phase that imparts a reduction in the elastic modulus of the body in a temperature range of 600° C.-1100° C., as compared to the room temperature elastic modulus (E-$mod_{RT}$) of the body and wherein a total porosity (%

P) of the body is % P≧45% and wherein a ratio of E-Mod$_{900}$/E-mod$_{RT}$ is less than or equal to 0.95.

2. The composite ceramic honeycomb body according to claim 1 consisting of a ceramic honeycomb wherein the first ceramic phase is a major phase comprising 80-98% by weight of the body, and wherein the first ceramic phase is substantially devoid of microcracks.

3. The composite ceramic honeycomb body according to claim 1 wherein the second phase is a minor glassy phase preferentially disposed at the grain boundaries of the first ceramic phase, and wherein the second phase softens in preference to the first ceramic phase in the temperature range of 600° C.-1100° C.

4. The composite ceramic honeycomb body according to claim 1 wherein the first ceramic phase is composed of a ceramic material selected from the group consisting of cordierite, mullite, SiC and zircon.

5. The composite ceramic honeycomb body according to claim 3 wherein the second phase is formed from a silicate glass selected from the group consisting of alkali- and/or alkaline-earth-containing borosilicate, aluminosilicate, and boroaluminosilicate glasses.

6. The composite ceramic honeycomb body according to claim 1 wherein the second phase is a glass-ceramic phase comprising cordierite, phlogophite, mullite and aluminum titanate.

7. A porous honeycomb ceramic structure, comprising:
a honeycomb ceramic structure having a substantially non-microcracked cordierite matrix and a minor phase that imparts at a reduction in the elastic modulus of the structure a 900° C. (E-Mod$_{900}$) as compared with the room temperature elastic modulus (E-mod$_{RT}$) of the structure wherein a total porosity (% P) of the structure is % P≧45% and wherein a ratio of E-Mod$_{900}$/E-mod$_{RT}$ is less than or equal to 0.95.

8. The honeycomb structure of claim 7 wherein the minor phase is formed from a silicate glass selected from the group consisting of alkali- and/or alkaline-earth-containing borosilicate, aluminosilicate, and boroaluminosilicate glasses.

9. The honeycomb structure of claim 7 wherein the minor phase is a glass-ceramic phase comprising cordierite, phlogophite, mullite, and aluminum titanate.

10. The honeycomb structure of claim 7 further comprising a total porosity (% P) wherein % P≧46%.

11. The honeycomb structure of claim 7 further comprising a total porosity (% P) wherein 45%≧% P≧55%.

12. The honeycomb structure of claim 7 further comprising a total porosity (% P) wherein % P≧50%.

13. The honeycomb structure of claim 7 further comprising a coefficient of thermal expansion (CTE) from room temperature to 800° C. of less than $16.0 \times 10^{-7}$/° C.

14. The honeycomb structure of claim 7 further comprising a coefficient of thermal expansion (CTE) from room temperature to 800° C. of less than $15.0 \times 10^{-7}$/° C.

* * * * *